US011175957B1

(12) United States Patent
Diamantopoulos et al.

(10) Patent No.: US 11,175,957 B1
(45) Date of Patent: Nov. 16, 2021

(54) HARDWARE ACCELERATOR FOR EXECUTING A COMPUTATION TASK

(71) Applicant: International Business Machines Corporation, Armonk, NY (US)

(72) Inventors: Dionysios Diamantopoulos, Thalwil (CH); Florian Michael Scheidegger, Effretikon (CH); Adelmo Cristiano Innocenza Malossi, Adliswil (CH); Christoph Hagleitner, Wallisellen (CH); Konstantinos Bekas, Horgen (CH)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/028,161

(22) Filed: Sep. 22, 2020

(51) Int. Cl.
   *G06F 9/30* (2018.01)
   *G06F 9/50* (2006.01)
   *G06F 9/38* (2018.01)

(52) U.S. Cl.
   CPC ........ *G06F 9/5027* (2013.01); *G06F 9/30018* (2013.01); *G06F 9/30145* (2013.01); *G06F 9/3836* (2013.01)

(58) Field of Classification Search
   CPC .............. G06F 9/5027; G06F 9/30018; G06F 9/30145; G06F 9/3836
   See application file for complete search history.

(56) References Cited

U.S. PATENT DOCUMENTS

| | | | |
|---|---|---|---|
| 10,409,767 B2* | 9/2019 | Henry | G06F 9/30029 |
| 10,459,866 B1* | 10/2019 | Fleming, Jr. | G06F 13/1668 |
| 10,726,329 B2* | 7/2020 | Lie | G06F 9/3016 |
| 10,776,699 B2* | 9/2020 | Das | G06F 9/30192 |
| 10,936,941 B2* | 3/2021 | Li | G06N 3/0454 |
| 10,943,039 B1* | 3/2021 | Sirasao | G06F 30/34 |
| 2019/0005161 A1 | 1/2019 | Fleming | |
| 2019/0042944 A1* | 2/2019 | Nair | G06N 3/063 |
| 2019/0304053 A1 | 10/2019 | Ould-Ahmed-Vall | |
| 2019/0340499 A1 | 11/2019 | Burger | |
| 2019/0354846 A1 | 11/2019 | Mellempudi | |
| 2020/0112708 A1* | 4/2020 | Morgan | G09G 3/2096 |
| 2020/0279153 A1* | 9/2020 | Fowers | G06N 3/0481 |
| 2021/0049463 A1* | 2/2021 | Ruff | G06N 3/04 |

(Continued)

OTHER PUBLICATIONS

Abdelouahab et al., "Accelerating CNN inference on FPGAs: A Survey", arXiv:1806.01683v1 [cs.DC], Jan. 2018, 30 Pages.

(Continued)

*Primary Examiner* — Cheng Yuan Tseng
(74) *Attorney, Agent, or Firm* — Stephanie L. Carusillo

(57) ABSTRACT

The present disclosure relates to a hardware accelerator for executing a computation task composed of a set of operations. The hardware accelerator comprises a controller and a set of computation units. Each computation unit of the set of computation units is configured to receive input data of an operation of the set of operations and to perform the operation, wherein the input data is represented with a distinct bit length associated with each computation unit. The controller is configured to receive the input data represented with a certain bit length of the bit lengths and to select one of the set of computation units that can deliver a valid result and that is associated with a bit length smaller than or equal to the certain bit length.

18 Claims, 7 Drawing Sheets

(56) References Cited

U.S. PATENT DOCUMENTS

| | | | | |
|---|---|---|---|---|
| 2021/0133093 A1* | 5/2021 | Yang | .................. | G06F 12/1483 |
| 2021/0200474 A1* | 7/2021 | Yang | ..................... | G06F 3/0652 |
| 2021/0201122 A1* | 7/2021 | Yang | ...................... | G06N 3/063 |

OTHER PUBLICATIONS

Amazon, "PicoEVB Artix-7 FPGA Development Board Kit M.2 NGFF PCIe MGT", Amazon.com, Inc., Accessed on Sep. 17, 2020, 5 Pages.

Anonymous et al., "Accelerating DNNs with Xilinx Alveo Accelerator Cards", Xilinx, WP504 (v1.0.1), Oct. 14, 2018, 11 Pages.

Anonymous et al., "Adoption of Intel FPGAs for Acceleration of Enterprise Workloads Goes Mainstream", Intel Newsroom, Apr. 11, 2018, 5 Pages.

Anonymous et al., "Alibaba Collaborating with Intel on an FPGA-based Solution to Help Customers Accelerate Business Applications", Design and Reuse, Mar. 10, 2017, 1 Page.

Anonymous et al., "FPGA Accelerated Cloud Server", Huawei Cloud, Accessed on Sep. 17, 2020, 6 Pages.

Attard, Amy, "Xilinx Powers Huawei FPGA Accelerated Cloud Server", Xilinx Inc., Sep. 6, 2017, 4 Pages.

Branscombe, Mary, "Why Microsoft Is Betting on FPGAs for Machine Learning at the Edge", Data Center Knowledge, May 29, 2019, 6 Pages.

Canziani et al., "An Analysis of Deep Neural Network Models for Practical Applications", arXiv:1605.07678v4 [cs.CV], Apr. 14, 2017, 7 Pages.

Danes, R., "FPGA chips could be the brains for AI at the IoT edge", Silicon Angle, Dec. 6, 2017, 8 Pages.

Diamantopoulos et al., "A System-level Transprecision FPGA Accelerator for BLSTM Using On-chip Memory Reshaping", 2018 International Conference on Field-Programmable Technology (FPT), pp. 338-341, Naha, Okinawa, Japan, 2018, 4 Pages.

Feldman, Michael, "Microsoft Takes FPGA-Powered Deep Learning to the Next Level", TOP 500, Aug. 23, 2017, 3 Pages.

Frank, Blair Hanley, "Microsoft's Brainwave makes Bing's AI over 10 times faster", Venture Beat, The Machine—Making Sense of AI, Mar. 26, 2018, 7 Pages.

Freund, Karl, "Microsoft: FPGA Wins Versus Google TPUs For AI", Forbes, Moor Insights and Strategy, Aug. 28, 2017, 8 Pages.

Hemsoth, Nicole, "An Early Look at Baidu's Custom AI and Analytics Processor", The Next Platform, Aug. 22, 2017, 10 Pages.

Hemsoth, Nicole, "Another Step Toward FPGAs in Supercomputing", The Next Platform, Apr. 4, 2018, 11 Pages.

McGrath, Dylan, "New Xilinx CEO Touts 'Adaptive Computing", EE Times, Mar. 19, 2018, 3 Pages.

Moss, Sebastian, "Google unveils second generation TPU, available as a service", Data Center Dynamics, May 18, 2017, 4 Pages.

Sze et al., "Efficient Processing of Deep Neural Networks: A Tutorial and Survey", arXiv:1703.09039v2 [cs.CV], Aug. 13, 2017, 32 Pages.

Wong, William G., "Xilinx SoC FPGA Powers Baidu's Apollo Driverless Platform", ElectronicDesign, Jan. 2, 2020, 4 Pages.

Xu et al., "Scaling for edge inference of deep neural networks", Nature Electronics, Apr. 2018, 8 Pages.

* cited by examiner

HARDWARE ACCELERATOR FOR EXECUTING A COMPUTATION TASK

BACKGROUND

The present invention relates to the field of digital computer systems, and more specifically to a hardware accelerator.

Hardware acceleration enables the use of a computer hardware specially made to perform some functions more efficiently than is possible in software running on a general-purpose central processing unit (CPU). However, there is a need to improve the logic utilization of hardware accelerators.

SUMMARY

Various embodiments provide a hardware accelerator, a method for a hardware accelerator, and computer program product for a hardware accelerator. Embodiments of the present invention can be freely combined with each other if they are not mutually exclusive.

In one aspect, the invention relates to a hardware accelerator for executing a computation task composed of a set of operations. The hardware accelerator comprises a controller and a set of computation units, each computation unit of the set of computation units being configured to receive input data of an operation of the set of operations and to perform the operation, wherein the input data is represented by a distinct bit length associated with the each computation unit, thereby the set of computation units being associated with a set of distinct bit lengths, the controller being configured to receive the input data represented with a certain bit length of the set of bit lengths and to select the computation unit of the set of computation units that can deliver a valid result, wherein the selected computation unit is associated with a bit length smaller than or equal to the certain bit length, wherein an output of the selected computation unit is provided as a result of the operation.

In another aspect, the invention relates to a method for executing a computation task composed of a set of operations. The method comprises: providing a hardware accelerator comprising a controller and a set of computation units; receiving at each computation unit of the set of computation units input data of an operation of the set of operations and to perform the operation, wherein the input data is represented with a distinct bit length associated with the each computation unit; receiving at the controller the input data represented with a certain bit length of the bit lengths associated with the set of computation units; selecting by the controller the computation unit of the set of computation units that can deliver a valid result, the selected computation unit being associated with a bit length smaller than or equal to the certain bit length; and providing an output of the selected computation unit as a result of the operation.

In another aspect, the invention relates to a computer program product comprising a computer-readable storage medium having computer-readable program code embodied therewith, the computer-readable program code configured to implement the method.

BRIEF DESCRIPTION OF THE DRAWINGS

In the following embodiments of the invention are explained in greater detail, by way of example only, making reference to the drawings in which.

DETAILED DESCRIPTION

Figure 1:
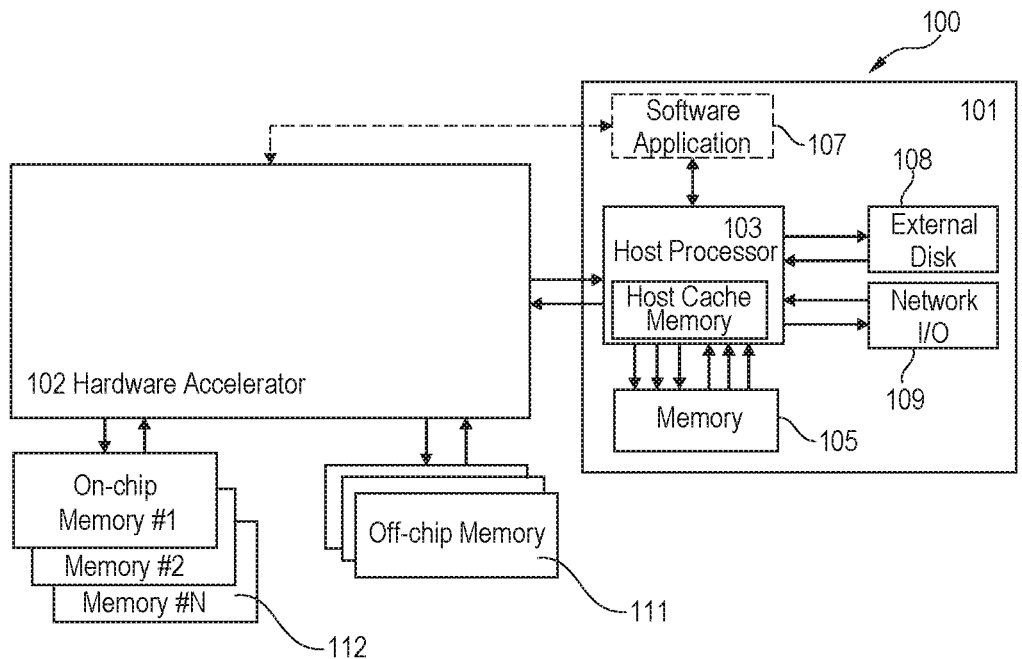
FIG. 1 is a block diagram of a hardware acceleration system in accordance with an embodiment of the present invention.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The computation task may be any task that is composed of operations that may be performed by the hardware accelerator. The set of operations may be basic computations that can be performed by the hardware accelerator. Each operation of the set of operations may, for example, comprise a multiplication operation, addition operation, or another operation such as an Open Neural Network Exchange (ONNX) operation or a Neural Network Exchange Format (NNEF) operation. The computation task may, for example, be a training or inference of a neural network. The set of operations may be tensor-operations, such as blocked-matrix operations and multi-dimensional convolutions.

The hardware accelerator may be configured to perform or implement at least part of the computation task, for example, the at least part of the computation task may be one operation of the set of operations. The hardware accelerator may be an integrated circuit that is configurable for performing data operations. The hardware accelerator may comprise a computer hardware specially made to perform some functions more efficiently than is possible in software running on a general-purpose central processing unit (CPU). The computer hardware may, for example, comprise a graphics processing unit (GPU), a field-programmable gate array (FPGA), or an application-specific integrated circuit (ASICs). The computation unit may, for example, comprise a two-dimensional systolic array. The systolic array may include a number of cells organized in columns and rows. The systolic array may have more rows than columns, more columns than rows, or have the same number of columns and rows. The systolic array may be hard-wired for specific operations, such as "multiply and accumulate", to perform massively parallel integration, convolution, correlation, matrix multiplication, or data sorting tasks. A computation unit may, for example, be configured to perform a logic function such as a multiply-add function. A computation unit may, for example, be a logic element of the FPGA. The logic element may, for example, comprise a 3-input lookup table (3-LUT) and a D-flipflop. A bitstream file may, for example, be used to configure the FPGA such that it determines the logic functions that may be performed by the set of computation units.

The set of computation units may be configured to perform the same operation concurrently. For example, the set of computation units may start execution of the operation at the same time. The smaller the bit length representing the input data, the faster the execution of the operation based on the input data. The computation unit associated with the certain bit length may be named a first computation unit. The certain bit length may, for example, be the highest bit length of the set of bit lengths. The selected computation unit may be the computation unit that may perform the data operation faster than the first computation and provide a valid result of the data operation. The valid result of the data operation may be a result of the data operation that is obtained from a valid representation of the input data. For example, a number 15 may validly be represented by a 5-bit or 4-bit representation, but may not be validly represented by a 3-bit representation, e.g., because the 3 least significant bits of a correct representation (e.g., 4-bit) of value 15 may only represent a maximum value of 7.

The controller (named first controller) may be configured to receive the input data of each operation of the set of operations and to select the computation unit that may provide a valid result of said operation. In another example, the hardware accelerator may comprise a second controller that is configured to receive input data of a subset of the set of operations, while the first controller is configured to receive input data of the remaining subset of the set of operations. As with the first controller, the second controller is configured to receive the input data represented with a certain bit length of the set of bit lengths and to select the computation unit of the set of computation units that can deliver a valid result of the operation associated with or assigned to the second controller.

The present invention may speed up the computations performed by the hardware accelerators. For that, the present invention involves a speculation of precision to deliver the results faster when the precision of the partial product allows it with no compromise in accuracy. The speculation of precision means that a computation unit reads only a number of least significant bits (LSB) of the input data and thus speculating that the ignored most significant bits (MSB) are 0. The present invention may thus provide parallel processing units with different precision capabilities. The selected computation unit may have a lower number of bits which means a smaller memory footprint, more efficient arithmetic units, lower latency, and higher memory bandwidth. The benefit of using a reduced precision format may lie in the efficiency of the multiply and accumulate operations, e.g., in deep learning inference or training. The hardware accelerator may, thus, enable a competitive inference system for a fast and efficient matrix multiplier.

According to one embodiment, the input data is received simultaneously at the set of computation units and the controller. This embodiment causes the computation units to (speculatively) start the execution at the same time. In parallel, the controller can decide, or select, which of the computation units can deliver the results faster when the precision of the partial product allows it with no compromise in accuracy.

The input data may, for example, comprise operands of the data operation. In case the data operation is a multiplication operation, the operands of the input data may be two operands. The controller may be configured to select the computation unit by, for example, calculating the maximum number of leading zeros that is present in both operands of the input data. The calculated number of leading zeros is indicative of a highest bit length that can be used to perform the operation faster without losing in accuracy. For example, if the number of calculated leading zeros is L and the highest bit length that is processed by the controller is n-bit, the selected computation unit may be associated with a bit length k-bit, wherein k≥n−L and k≤n. This may be advantageous as it may be implemented using a simplistic design of comparators (e.g., only logic gates may be used in the controller). Thus, the area and latency overhead of the controller may be small. The controller may be able to quickly decide which of the computation units can deliver valid results without overfloats.

According to one embodiment, the controller is configured to stop execution of the operation by the non-selected computation unit(s). The controller may be configured to generate control signals or commands to the set of computation units and other units of the hardware accelerator. For example, the set of computation units comprises N computation units, where N≥2. The controller is configured to stop execution of the operation by the non-selected N−1 computation units. For example, as soon as the controller makes a decision, the results of the selected computation unit are forwarded, and all the rest speculated execution may be forced to cancel the calculation.

According to one embodiment, the set of computation units comprise a first computation unit associated with the highest bit length of the set of bit lengths, wherein each computation unit of the set of computation units, which is different from the first computation unit, is a replication unit of the first computation unit. Computation unit replication refers to determining one or more copies of the first computation unit. The replication unit is a copy of the first computation unit.

The first computation unit may be associated with the bit length n-bit. Each computation unit of the remaining N−1 computation units may be associated with a distinct bit length n−j-bit where j has a value varying from 1 to n−1.

According to one embodiment, the highest bit length of the set of bit lengths is n-bit, wherein each computation unit of the set of computation units that is associated with a bit length k-bit smaller than n-bit is configured to read the k least significant bits (LSB) of the received input data. This embodiment may enable to provide inputs of each of the computation units from a same loaded data. That is, instead of converting all parameter values from a high precision to low precision, the same input data may be loaded and further used as input to the set of computation units. This may enable a speculation of precision by speculating that the ignored (unread) MSB bits are 0.

According to one embodiment, the hardware accelerator comprises a FPGA, a GPU, an ASIC, a neuromorphic device, or a bit-addressable device.

The FPGA is an integrated circuit designed to be configured by a customer or a designer after manufacturing. The FPGA configuration may generally be specified using a hardware description language (HDL). FPGAs may contain an array of programmable logic blocks, and a hierarchy of reconfigurable interconnects that allow the blocks to be wired together. Logic blocks can be configured to perform complex combinational functions. Each computation unit of the set of computation units may, for example, comprise a subarray of the array of the programmable logic blocks.

In one example, an FPGA may be provided, wherein the FPGA may comprise one computation unit (named initial or first computation unit) associated with the highest bit length, e.g., 8-bit. For example, the FPGA may be configured by an initial streaming file that enables the first computation unit of the FPGA. Furthermore, one or more copies of the first computation unit may be created. The one or more copies may be replication units. This may, for example, be performed by creating a bitstream file for configuring the FPGA to enable the replication units in addition to the first computation unit. In a first example, the created bitstream file may enable a partial configuration of the FPGA in order to provide the FPGA with multiple computation units, namely, the first computation unit and its copies. That is, the bitstream file may enable to reconfigure only sub-regions of the FPGA that cover the replication units. The FPGA may further be configured to include the controller. The bitstream file may, for example, be automatically created.

According to one embodiment, the set of computation units comprises a minimum number of computation units such that a logic utilization of the FPGA is higher than a predefined threshold. For the example, the logic utilization of the FPGA may be higher than 90%. Therefore, the silicon area of the FPGA may be used optimally.

According to one embodiment, the number of computation units of the set of computation units is the number of bits of the highest bit length of the set of bit lengths. For example, if the highest bit length is 8-bit, the set of computation units comprises 8 computation units. In one example, the set computation units are associated with bit lengths 8-bit, 7-bit, 6-bit, 5-bit, 4-bit, 3-bit, 2-bit, and 1-bit respectively. In this case, the controller has a step size of one. This may be advantageous as it covers all possible representations. In another example, the controller may have a step size of two such that the set computation units are associated with bit lengths 8-bit, 6-bit, 4-bit and 2-bit. This may be advantageous as it may lower the area occupied by the controller. In one example, the step size of the controller may be defined by a user. In another example, the step size may be determined by profiling the input data, and based on their statistic distributions, the controller's step size may be determined. For example, if 80% of the calculations involve numbers in the form of XXX0000X, then the step size may be defined accordingly.

According to one embodiment, the computation task is one of: training a deep neural network, inference of a deep neural network, matrix-vector multiplication, and matrix-matrix multiplication.

According to one embodiment, the input data of the operation comprises two operands of a multiplication. The controller comprises a cascade of logic gates to determine a maximum number of leading zeros that is present in the operands of the input data, wherein the maximum number of leading zeros is indicative of the bit length of the selected computation unit. The maximum number of leading zeros may be associated with a bit length that is higher than or equal to the bit length of the selected computation unit. This embodiment may provide a simplistic design of the controller (e.g., only logic gates may be used), which may lower the area and latency overhead of the controller.

For example, the set of commutation units comprises a computation unit associated with 8-bit and computation units associated with 3-bit and 5-bit. If the selected bit is 2-bit, then the computation unit associated with 3-bit or 5-bit may be selected, preferably the smallest of the two may be selected. If the selected bit is 4-bit, then the computation unit with 5-bit is selected since it is the only one having a bit length higher than 4-bit and smaller than 8-bit.

According to one embodiment, the controller and the set of computation units are configured to operate in pipeline order. This may enable high-throughput data processing.

According to one embodiment, the selected computation unit is associated with the smallest bit length that is smaller than or equal to the certain bit length.

A computation unit is associated with a bit length meaning that the computation unit may perform operations using operands or values of the input data that are represented by said bit length.

According to one embodiment, the certain bit length is the highest bit length of the set of bit lengths.

FIG. 1 is a block diagram of a hardware acceleration system 100 in accordance with an embodiment of the present invention. The hardware acceleration system 100 may be a heterogeneous processing system. For example, the hardware acceleration system 100 may comprise different types of processing units such as CPU, GPU, FPGA, ASICs, etc.

For simplification of the description, FIG. 1 shows a simplified configuration of a host computer 101 coupled to a hardware accelerator 102 that provides acceleration for processing data in comparison to processing data in software. However, it is not limited to that configuration and other configurations of the hardware acceleration system 100 may be used, e.g., a configuration involving multiple hardware accelerators coupled to a host computer may be used or a configuration involving only hardware accelerators may be used.

The hardware accelerator 102 may be connected to the host computer 101 through a PCI express bus or Ethernet connection. The host computer 101 may be configured to execute initial boot procedures, basic 110 functions, and so on. The host computer 101 may comprise a host processor 103, such as a CPU. The host processor 103 may be configured to access to data stored in an external disk 108 and data stored in a local host cache memory. The host processor 103 may communicate data via a network interface 109. The hardware accelerator 102 has an accelerator architecture that is optimized, with respect to the host computer architecture, for speeding up the execution of a particular class of computing functions. Such accelerated computing functions include, for example, vector processing and floating point operations.

The hardware acceleration system 100 may be configured to implement an application such as an inference of a trained neural network, e.g., the hardware acceleration system 100 may be a FPGA based neural network accelerator system.

The host computer 101 and the hardware accelerator 102 are adapted to communicate data. This data communication may be done through a connection such as a PCIe bus or Ethernet connection. In another example, the hardware accelerator 102 may be part of the host computer 101. The hardware accelerator 102 and the host processor 103 may share the same package or the same die. In this case, the communication link between the hardware accelerator 102 and the host processor 103 may be any of the commonly used in-package or on-chip communication buses, e.g., AXI, Wishbone, etc. The hardware accelerator 102 may read input data from a global memory and perform the computation. The input data may be received via a network interface as a stream of network phits (the network interface may stream in and out fixed size data). The outputs may be written back to the global memory and may be sent as a stream of network phits via the network interface.

For example, the hardware accelerator 102 may comprise a FPGA. The host processor 103 and the FPGA may be configured so as to execute or implement the computation task. The host processor 103 may be coupled to a memory 105 storing a compiled software application 107. The compiled software application 107 includes function calls. The FPGA coupled to the hardware processor may include a compiled user function. The compiled user function may be executable in response to one of the function calls. The function call may comprise a message of variables that need to be processed by the user function. The hardware accelerator may be coupled to memories such as off-chip memories 111 and on-chip memories 112 for storing, for example, intermediate computation results of the hardware accelerator.

The hardware accelerator 102 may be configured for executing a computation task composed of a set of operations. For example, the hardware accelerator comprises a controller and a set of computation units, wherein the set of computation units comprises at least a first computation unit and a second computation unit. The first computation unit is configured to receive input data of an operation of the set of operations and to perform the operation, wherein the input data is represented with a first bit length. The second computation unit is configured to receive said input data represented with a second bit length and to perform said operation. The controller is configured to receive the input data represented with the highest bit length of the first and second bit lengths and to select one of the set of computation units that can deliver a valid result first, wherein the output of the selected computation unit is provided as a result of the operation. In one example, the first bit length is n-bit and the second bit length is k-bit, where k is smaller than n, wherein the second computation unit is configured to read the k least significant bits (LSB) of the received input data.

Figure 2:
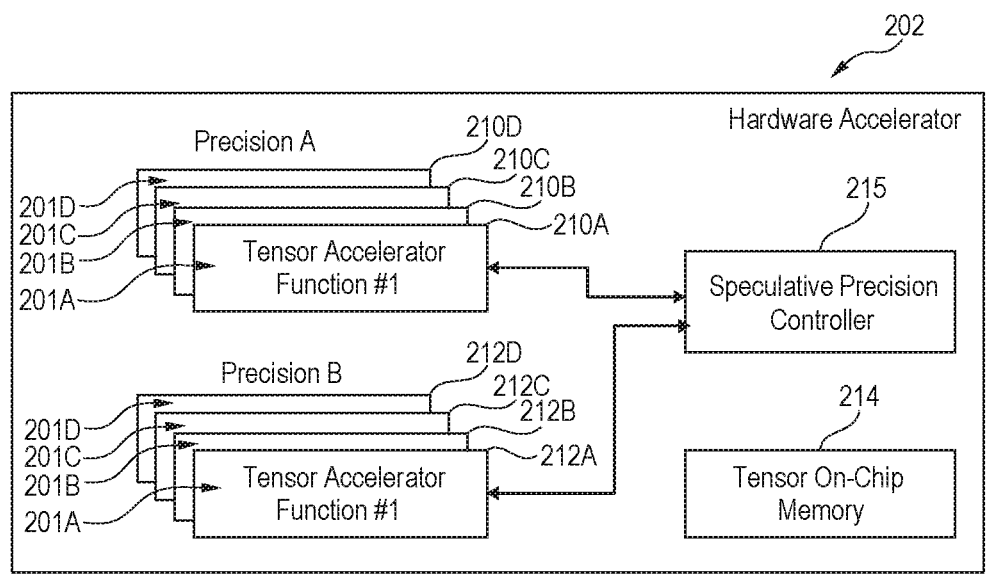
FIG. 2 is a block diagram of a hardware accelerator in accordance with an embodiment of the present invention.

FIG. 2 depicts a block diagram of a hardware accelerator 202 such as a FPGA in accordance with an embodiment of the present invention.

The hardware accelerator 202 may be configured to perform a computation task. The hardware accelerator 202 may be named a tensor co-processor as it may be configured to process tensors. The tensor may be a multi-dimensional array with a uniform type. A zero-order tensor may be a scalar. Each individual number of a tensor may be a zero-order tensor. First-order tensors are vectors. The computation task may, for example, comprise a set of operations 201A through 201D, which may be tensor accelerator functions. Each operation of the set of operations may, for example, comprise one or more ONNX operators or one or more NNEF operators. Each operation of the set of operations 201A through 201D may be performed based on input data. For example, if the operation is a multiplication operation, the input data may be the two operands of the multiplication. The hardware accelerator 202 may be configured to perform the set of operations 201A through 201D using multiple precisions. As shown in FIG. 2, the hardware accelerator 202 may be configured to perform the set of operations 201A through 201D (e.g., tensor accelerator function #1-4) using different fixed numbers of bits to represent the input data. For example, two distinct numbers of bits may be used to represent input data as indicated by precision A and precision B in FIG. 2. For example, precision A may refer to 8-bit representation and precision B may refer to 3-bit representation. For that, the hardware accelerator 202 may comprise computation units 210A through 210D for performing respectively the operations 201A through 201D using the precision A and replication units 212A through 212D for performing respectively the operations 201A through 201D using the precision B. The replication units 212A through 212D may be a copy of the computation units 212A through 212D respectively. Thus, for each operation, e.g., 201A of the set of operations 201A through 201D, there is a respective pair of units comprising a computation unit 210A and a replication unit 212A that may perform said operation.

Each unit of the computation units 210A through 210D and the replication units 212A through 212D is configured to receive input data of the associated operation 201A through 201D and to perform the operation, wherein the input data is represented with a distinct bit length (or bit-width) associated with the unit. For example, the computation unit 210A may be configured to receive input data with precision A of the associated operation 201A and to perform the operation 201A. The replication unit 212D may be configured to receive input data with precision B of the associated operation 201D and to perform the operation 201D. Thus, the replication unit may use a word with a lower bit-width to represent a value.

Each pair of the pairs of units may be connected to a controller 215 (also named speculative precision controller (SPC)). For each pair of the pairs, the controller 215 is configured to receive the input data represented with the highest bit length and to select one of the units of the pair that can deliver a valid result first, wherein the output of the selected unit is provided as a result of the operation. For example, for the pair of units comprising the computation unit 210A and replication unit 212A, the controller 215 is configured to receive the input data of the operation 201A, wherein the received input data are in precision A that corresponds to the highest bit length 8-bit. The controller 215 may select one of the two units 210A and 212A of the pair that can deliver a valid result first/earlier. The replication unit 212A may perform the operation 201A faster than the computation unit 210A because it uses data with less precision. The controller 215 may thus decide whether the result that is provided by the replication unit 212A is a valid result. For that, the controller may, for example, calculate the number of leading zeros on the operands of the input data of the data operation 201A (e.g., as described with reference to FIG. 4). As soon as the controller makes a decision, the results of the respective unit are forwarded, and the remaining speculated execution may be forced to cancel the calculation. The hardware accelerator 202 further comprises an on-chip memory 214, e.g., tensor on chip memory, for storing intermediate processing results and/or providing the necessary data to each computation unit every cycle.

The selection of how many replication units and which precision they should represent may be an optimization problem that trades off efficiency and silicon area and depends on the problem data. For that, common optimizers can be employed (simulation and profiling of data can guide the optimizers).

Figure 3:
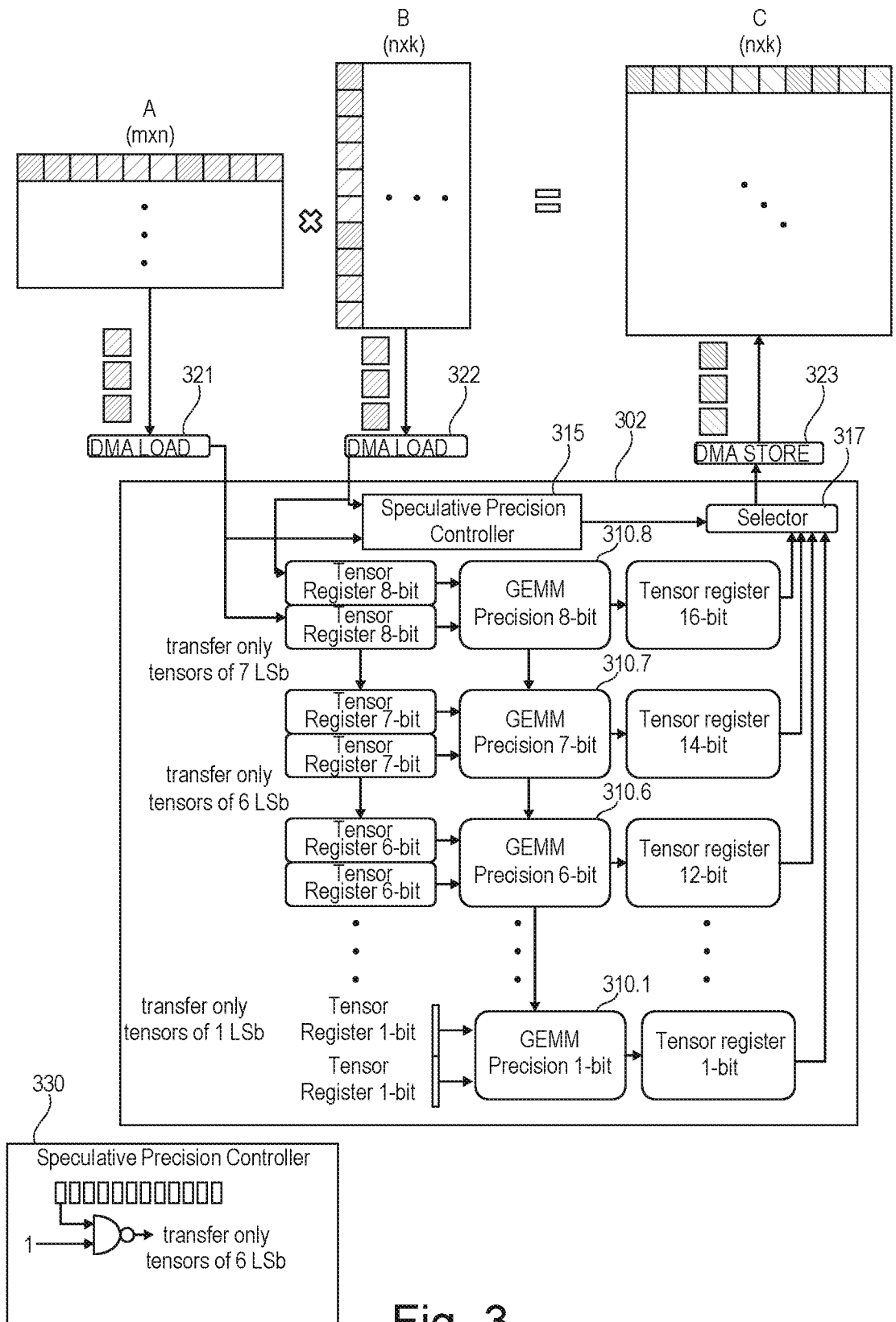
FIG. 3 is a block diagram of a hardware accelerator in accordance with an embodiment of the present invention.

FIG. 3 is a block diagram of a hardware accelerator 302 in accordance with an embodiment of the present invention. The hardware accelerator 302 may be configured to compute matrix-matrix multiplication A*B of the matrices A and B in order to obtain the output matrix C. The matrix-matrix multiplication A*B may comprise a set of operations, wherein each operation of the set of operations may require two operands of the matrices A and B respectively.

The hardware accelerator 302 comprises a set of computation units 310.1 through 310.8. Each of the computation units 310.1 through 310.8 may, for example, be a General Matrix Multiply (GEMM) core of a FPGA. Each of the 8 computation units 310.1 through 310.8 is associated with a respective bit length. The computation unit 310.1 is associated with the bit length 1-bit. The computation unit 310.2 is associated with the bit length 2-bit. The computation unit 310.3 is associated with the bit length 3-bit. The computation unit 310.4 is associated with the bit length 4-bit. The computation unit 310.5 is associated with the bit length 5-bit. The computation unit 310.6 is associated with the bit length 6-bit. The computation unit 310.7 is associated with the bit length 7-bit. The computation unit 310.8 is associated with the bit length 8-bit. The expression "computation unit U is associated with the bit length lb" means that the computation unit U is configured to receive or process input data being represented with the bit length lb.

Each of the computation units 310.1 through 310.8 is connected to a pair of input registers that store two input operands in accordance with the bit length of the computation unit. The computation unit 310.8 is connected to a pair of 8-bit input registers (named tensor register 8-bit). The computation unit 310.7 is connected to a pair of 7-bit input registers (named tensor register 7-bit). The computation unit 310.6 is connected to a pair of 6-bit input registers (named tensor register 6-bit). The computation unit 310.5 is connected to a pair of 5-bit input registers (named tensor register 5-bit). The computation unit 310.4 is connected to a pair of 4-bit input registers (named tensor register 4-bit). The computation unit 310.3 is connected to a pair of 3-bit input registers (named tensor register 3-bit). The computation unit 310.2 is connected to a pair of 2-bit input registers (named tensor register 2-bit). The computation unit 310.1 is connected to a pair of 1-bit input registers (named tensor register 1-bit).

Each of the computation units 310.1 through 310.8 is configured to perform an operation (e.g., multiplication) of the two operands stored in the pair of input registers to which the computation unit is connected and to output the result of the operation into an output register to which the computation unit is connected. The computation unit 310.8 is connected to the 16-bit output register (named tensor register 16-bit). The computation unit 310.7 is connected to the 14-bit output register (named tensor register 14-bit). The computation unit 310.6 is connected to the 12-bit output register (named tensor register 12-bit). The computation unit 310.5 is connected to the 10-bit output register (named tensor register 10-bit). The computation unit 310.4 is connected to the 8-bit output register (named tensor register 8-bit). The computation unit 310.3 is connected to the 6-bit output register (named tensor register 6-bit). The computation unit 310.2 is connected to the 4-bit output register (named tensor register 4-bit). The computation unit 310.1 is connected to the 1-bit output register (named tensor register 1-bit).

The hardware accelerator 302 further comprises a controller 315 and a selector 317. The controller, also called the speculative precision controller, 315 is connected to the set of computation units 310.1 through 310.N and to the selector 317. The selector 317 is configured to receive data of the output registers. Although shown as separate components, the controller 315 and the selector 317 may, in another example, form an integral part.

The input data of each operation of the set of operations may be obtained from the matrices A and B using a direct memory access (DMA) that enables to load input data into the DMA loads 321 and 322. For example, the two operands of each operation may be loaded into the two DMA loads 321 and 322, respectively, before being stored in the pair of input registers with the highest bit length and before being provided as input to the controller 315. As shown in FIG. 3, the two operands of a given operation, e.g., OP1, are represented with the 8-bit representation and may first be stored in the pair of input 8-bit registers. In one example, the input registers of the remaining computation units 310.1 through 310.7 may have the same size as the number of bits of their associated bit length, e.g., the computation unit 310.7 may have a 7-bit wide register, etc. The 7 LSB bits of the two operands stored in the pair of input 8-bit registers are transferred to the pair of input 7-bit registers. The 6 LSB bits of the two operands stored in the pair of input 7-bit registers are transferred to the pair of input 6-bit registers. The 5 LSB bits of the two operands stored in the pair of input 5-bit registers are transferred to the pair of input 5-bit registers. The 4 LSB bits of the two operands stored in the pair of input 5-bit registers are transferred to the pair of input 4-bit registers. The 3 LSB bits of the two operands stored in the pair of input 4-bit registers are transferred to the pair of input 3-bit registers. The 2 LSB bits of the two operands stored in the pair of input 3-bit registers are transferred to the pair of input 2-bit registers. The 1 LSB bit of the two operands stored in the pair of input 2-bit registers are transferred to the pair of input 1-bit registers.

Each of the computation units 310.1 through 310.8 may perform the given operation OP1 using the two operands stored in the respective pair of input registers. The controller 315 may select one of the computation units 310.1 through 310.N as the computation unit that can provide a valid result of the operation OP1 in the fastest way. The result of the selection may be provided by the controller 315 as input to the selector 317. The selector 317 may use said input to select one of the results received from the output registers. The result of the operation OP1 may be provided by the selector 317 to the DMA store 323 in order to be stored as part of the result matrix C. In another example, the input registers of the computation units 310.1 through 310.8 may have the same size, e.g., 8-bit, wherein the input registers of each of the remaining computation units 310.1 through 310.7 are associated with a logic as indicated with component 330 that selects the LSB bits associated with the computation unit. The component 330 describes, for example, the input register of the computation units 310.6.

Figure 4:
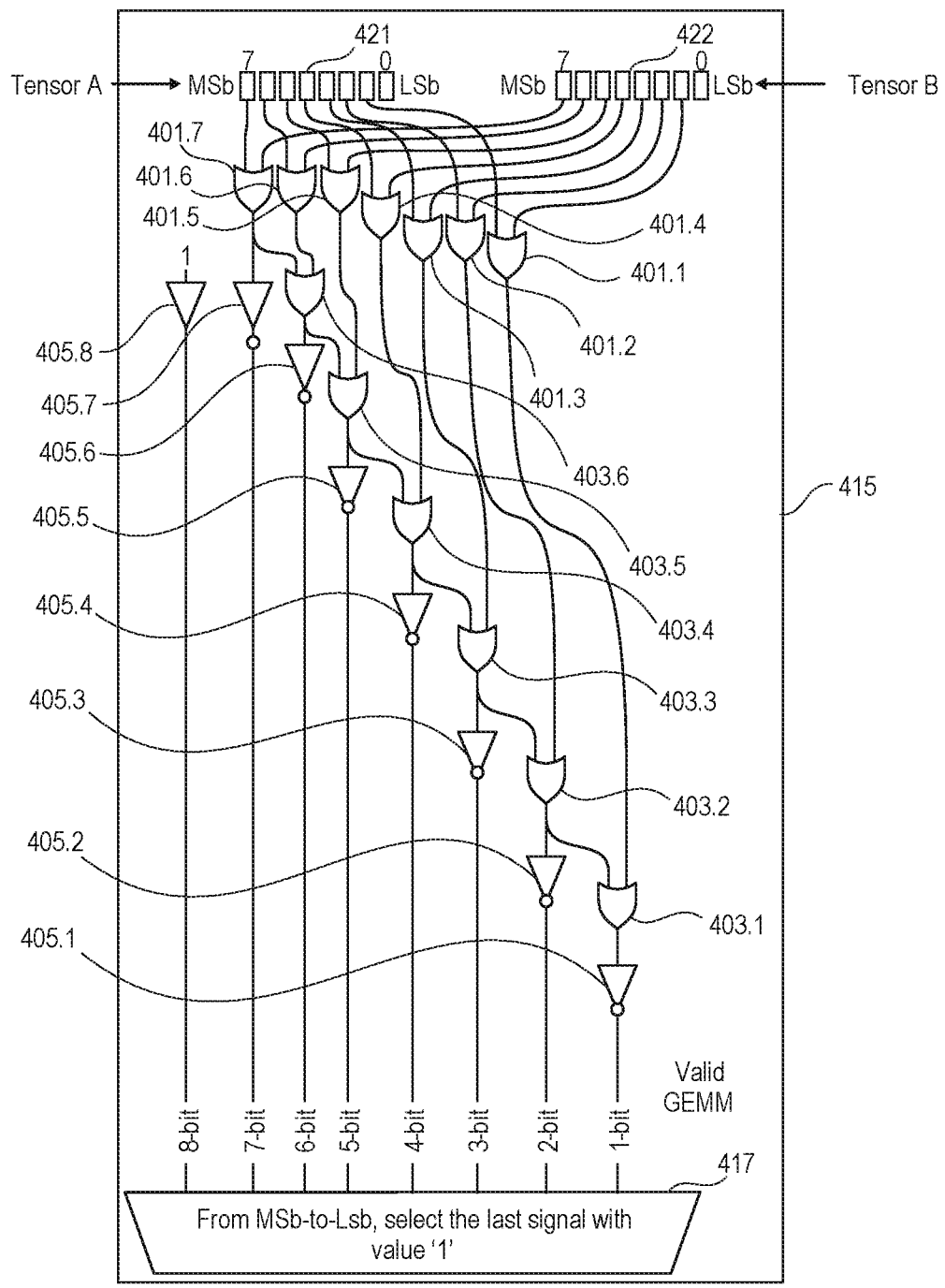
FIG. 4 is a block diagram of a controller in accordance with an embodiment of the present invention.

FIG. 4 is a block diagram of a controller 415 in accordance with an embodiment of the present invention. The controller 415 is configured to receive two input operands 421 and 422 of an operation of the matrix-matrix multiplication A*B. The two operands are represented by an 8-bit representation. For example, the first operand 421 comprises 8 bits ordered from b0 to b7, where b0 is the LSB of the 8 bits. The second operand 422 comprises 8 bits ordered from c0 to c7, where c0 is the LSB of the 8 bits.

Each pair of bits of the pairs (b7, c7), (b6, c6), (b5, c5), (b4, c4), (b3, c3), (b2, c2) and (b1, c1) may be input to a respective OR gate 401.1 through 401.7 of the controller 413. The outputs of the pair of OR gates 401.7 and 401.6 may be connected to an OR gate 403.6. The outputs of the pair of OR gates 403.6 and 401.5 may be connected to an OR gate 403.5. The outputs of the pair of OR gates 403.5 and 401.4 may be connected to an OR gate 403.4. The outputs of the pair of OR gates 403.4 and 401.3 may be connected to an OR gate 403.3. The outputs of the pair of OR gates 403.3 and 401.2 may be connected to an OR gate 403.2. The outputs of the pair of OR gates 403.2 and 401.1 may be connected to an OR gate 403.1.

Each of the OR gates 401.7 and 403.1 through 403.6 may be connected to a respective NOT gate 405.1 through 405.7. The output of each of the NOT gates 405.1 through 405.7 may be indicative of one of 1-bit, 2-bit, . . . 7-bit representations respectively. The 8-bit representation is associated with an output of a NOT gate 405.8 which receives value "1" as input. The controller 415 further comprises a selector 417 that is configured to receive the outputs of the NOT gates 405.1 through 405.8 and parse them from MSB to LSB in order to select the last signal/output with value "1". If, for example, the selected signal is the one that corresponds to 3-bit representation, this indicates that the controller 415 may select the computation unit that is associated with the 3-bit representation to provide the result of the operation.

Figure 5:
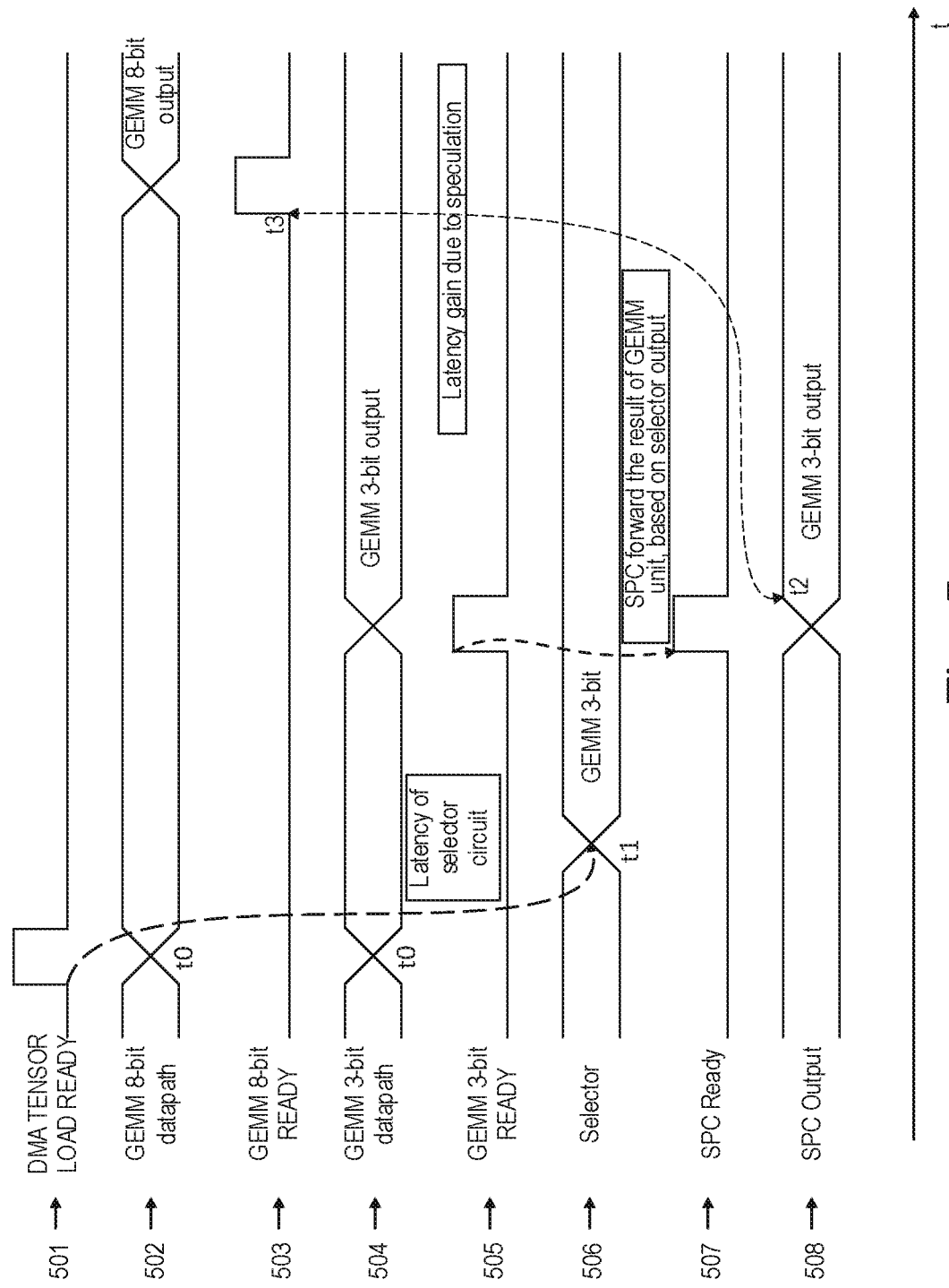
FIG. 5 is a diagram illustrating the execution flow of a given data operation in accordance with an embodiment of the present invention.

FIG. 5 is a diagram illustrating the execution flow of a give data operation in accordance with an embodiment of the present invention. In this example, the set of computation units comprises an 8-bit GEMM and 3-bit GEMM.

The diagram of FIG. 5 shows data paths associated with the components involved in the computation of the data operation. The data path 501 indicates the time at which the input operands are ready in the DMA loads 321 and 322. The data operation starts at the 8-bit GEMM and 3-bit GEMM at the same time t0 as indicated by data paths 502 and 504 respectively. The data paths 503 and 505 indicate the time at which the 8-bit GEMM and 3-bit GEMM are ready respectively. The data path 506 indicates that the selector 317 selects the 3-bit GEMM at time t1 before any of the 8-bit GEMM and 3-bit GEMM was ready. Thus, the controller 315 may be ready at the same time the selected 3-bit GEMM was ready. This is indicated in data path 507. The result of the data operation may be provided at time t2 as output of the controller 315 and shown in data path 508. As shown in FIG. 5, the present invention may enable to gain the time difference between time t2 and the time t3 at which the 8-bit GEMM was ready.

Figure 6:
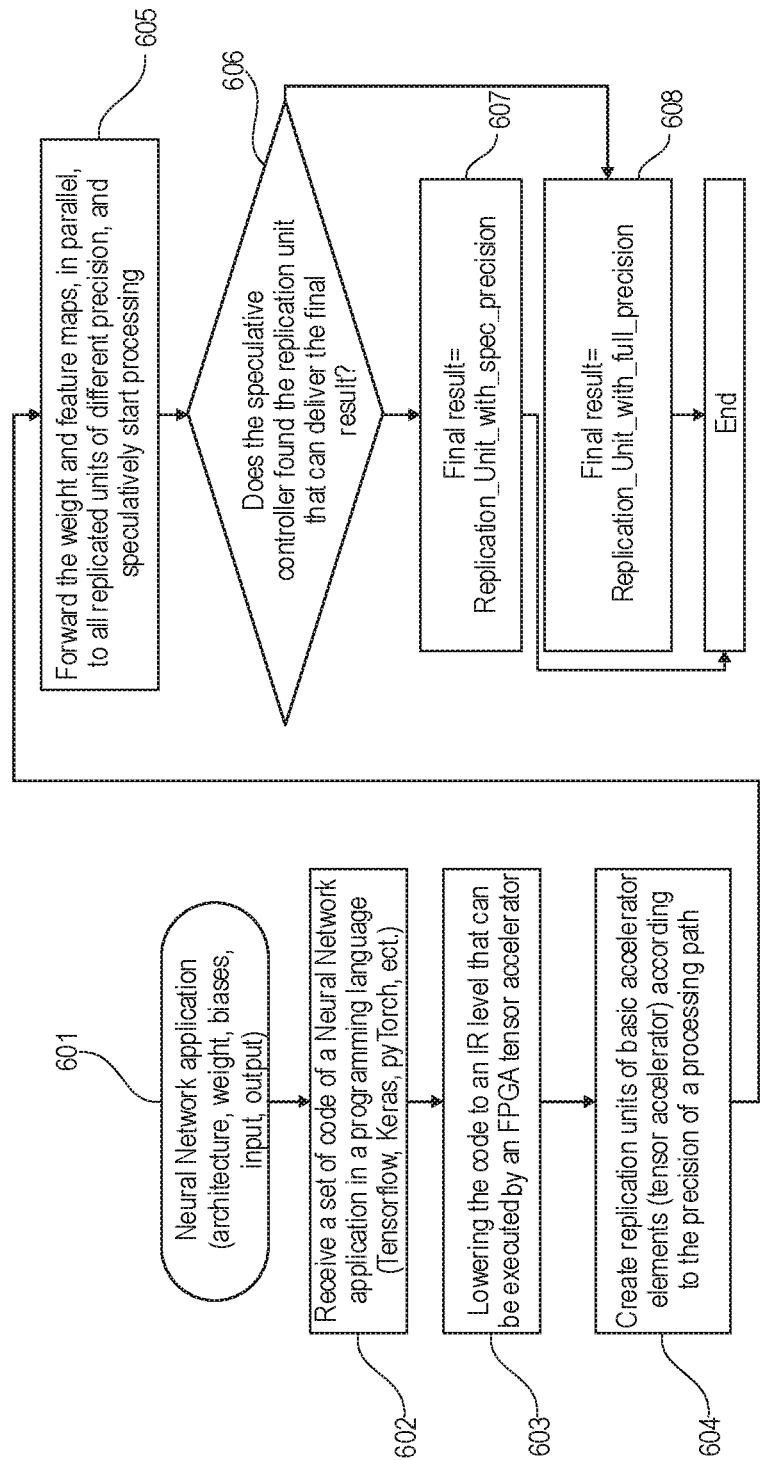
FIG. 6 is a flowchart of a method for performing a computation task using a hardware accelerator in accordance with an embodiment of the present invention.

FIG. 6 is a flowchart of a method for performing a computation task using a hardware accelerator in accordance with an embodiment of the present invention. The computation task may be an inference of a neural network. The hardware accelerator may be an FPGA tensor accelerator. The hardware accelerator may comprise a first computation unit that is configured to perform operations of the computation task with a full precision, e.g., 8-bit. For the purpose of explanation, the method may be implemented in the hardware acceleration system 100 illustrated in previous FIGS. 1-2 but is not limited to this implementation.

A neural network application may be provided in step 601. For example, the architecture and parameters of the neural network may be provided. The parameters may be weights, biases, and types of input/output data of the neural network. The code of the neural network application may be received in step 602. The code may, for example, be in a programming language such as Tensorflow, Keras, pyToch, etc. The received code may be adapted in step 603 in order to be executed by the hardware accelerator. For example, the code may be lowered to an intermediate representation (IR) level that can be executed by the hardware accelerator. Replication units may be created in step 604 from the first computation unit according to different precisions. The parameters of the neural network may be forwarded in step 605 to the replication units so that processing of the application may start at the first computation unit and the replication units. It may be determined in step 606 if the controller has found the replication unit that can deliver the result of the operation. If it is determined in step 606 that the controller has not found the replication unit that can deliver the result of the operation, the result of the first computation unit may be used in step 608. If it is determined in step 606 that the controller has found a replication unit that can deliver the result of the operation the result of the found replication unit may be used in step 607.

Figure 7:
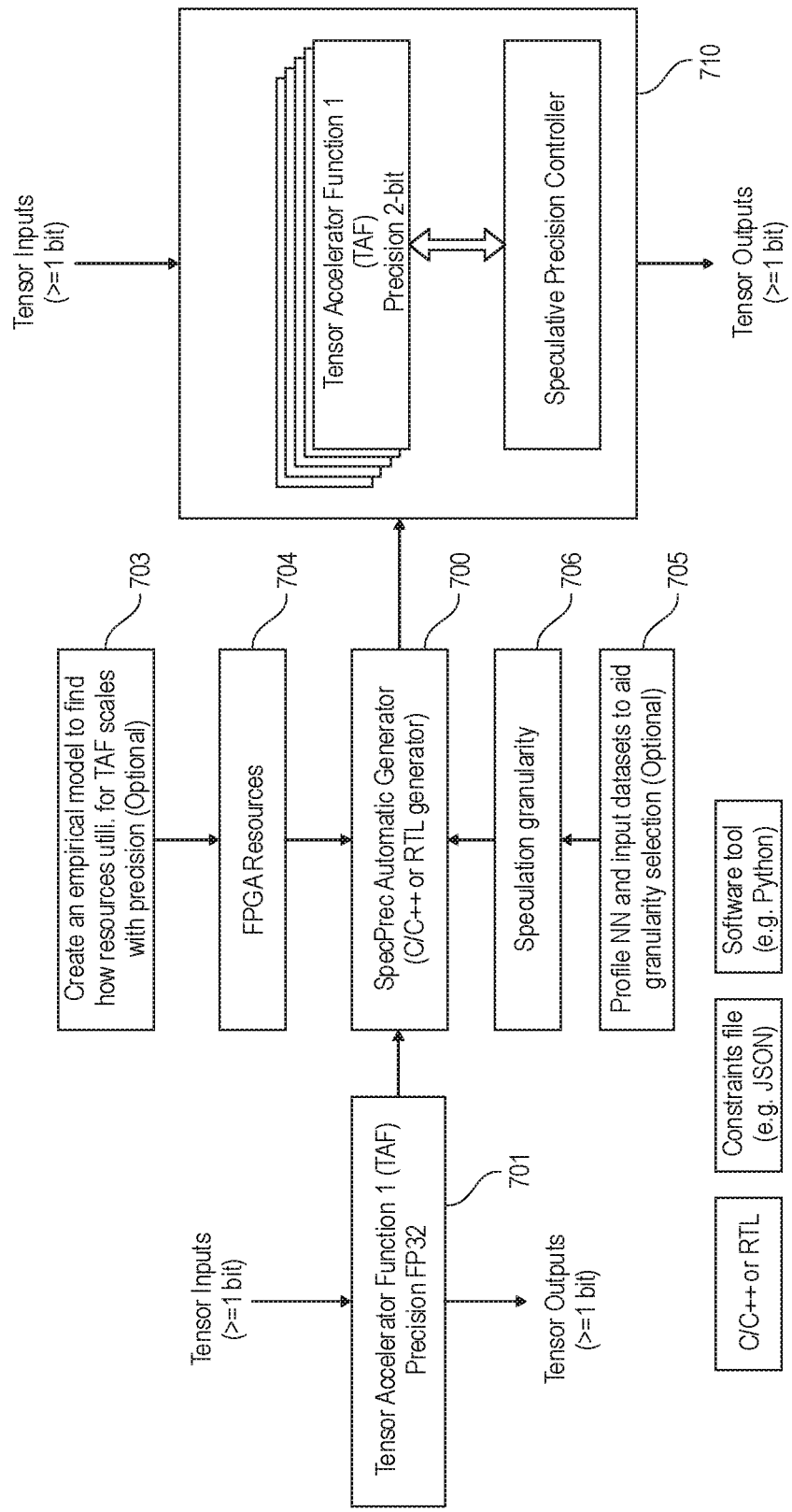
FIG. 7 is a flowchart of a method for creating replication units in accordance with an embodiment of the present invention.

FIG. 7 is a flowchart of a method for creating replication units in accordance with an embodiment of the present invention. The method of FIG. 7 may for example be performed by an automatic generator 700 using a FPGA 710. The FPGA 710 may comprise a controller and first computation unit that can perform data operations with a full precision, e.g., 8-bit.

A data operation (e.g., of a neural network) may be defined in step 701. The data operation may, for example, be a tensor accelerator function. An empirical model may be created in step 703. The empirical model may define how FPGA resources of step 704 for performing the data operation can scale with different precisions, e.g., it may define how FPGA resources required for performing the data operation using a 6-bit representation can be obtained from FPGA resources used for performing the data operation using a 8-bit representation. As indicated in FIG. 7, step 703 may be optional as the FPGA resources provided in step 704 may be sufficient to generate the bit stream file. A profile of the neural network and input datasets provided in step 705 may be used to determine in step 706 the speculation granularity. The speculation granularity may indicate the bit representations that can be used (in addition to the full 8-bit precision) to perform the data operation, e.g., 2-bit representation and 6-bit representation may be determined in step 706. The automatic generator 700 may receive as input the data operation, the empirical model, the speculation granularity, and FPGA resources in order to generate a bit stream file that can create replication units in the FPGA 710 according to the speculation granularity. The bitstream file may configure the FPGA 710 so that the data operation can be performed in accordance with the present invention. As indicated in FIG. 7, different tools may be used to perform the method of FIG. 7. For example, steps 700, 703, and 705 may be provided with a software tool such as Python. The FPGA resources and the speculation granularity may be described in constraint files such as JSON files. The tensor accelerator function in step 701 may be implemented in a high-level programming language (e.g., C, C++, SystemC, OpenCL, Chisel, Python, etc.), an HDL language (e.g., VHDL, Verilog, etc.), or any form of semiconductor intellectual property core (e.g., soft-core, hard-core, encrypted netlist, etc.)

Figure 8:
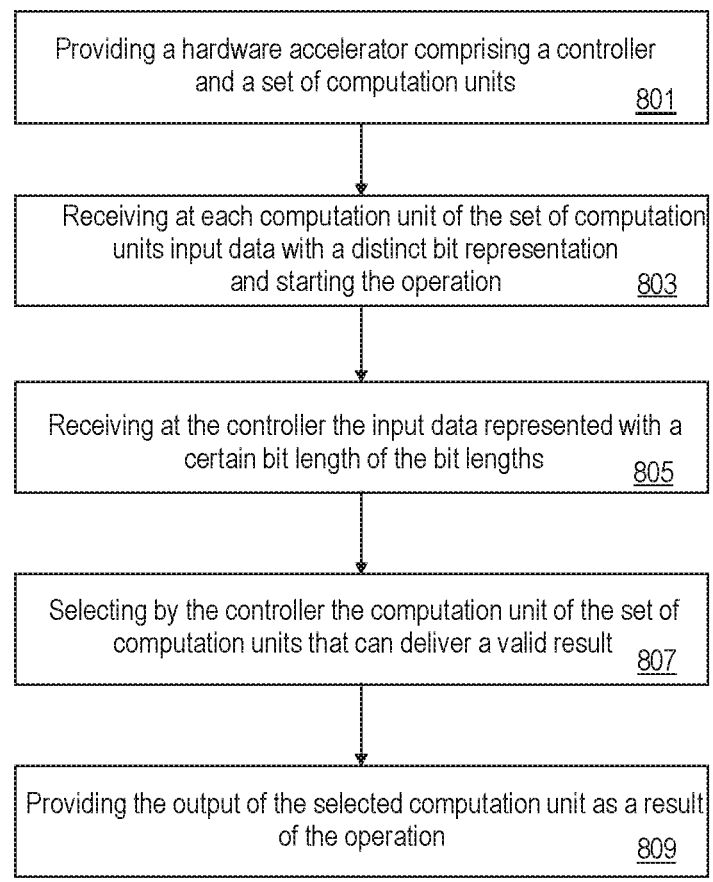
FIG. 8 is a flowchart of a method for executing a computation task composed of a set of operations in accordance with an embodiment of the present invention.

FIG. 8 is a flowchart of a method for executing a computation task composed of a set of operations in accordance with an embodiment of the present invention. The computation task may be broken down into the set of operations such that the results of the set of operations represent a result of the computation task. A hardware accelerator comprising a controller and a set of computation units may be provided in step 801. Each computation unit of the set of computation units may receive in step 803 input data of an operation of the set of operations and to start the operation in order to be performed, wherein the input data is represented with a distinct bit length associated with the each computation unit. The controller may receive in step 805 the input data represented with a certain bit length of the bit lengths. The certain bit length of the bit lengths may, for example, be the highest bit length of the bit lengths. The controller may select in step 807 the computation unit of the set of computation units that can deliver a valid result, and that is associated with a bit length smaller than or equal to the certain bit length. The controller and each of the set of computation units may receive the input data simultaneously and may start respective execution at the same time. Steps 803-807 may be performed concurrently. The output of the selected computation unit may be provided in step 809 as a result of the operation. Steps 803 to 809 may be repeated for each operation of the set of operations. For example, the controller may or may not select the same computation unit in different iterations.

The input data of each operation of the set of operations may be of integer type, float type, or hybrid-float type. In case of a float type input, the hardware accelerator may further comprise a unit that is configured to perform a float-to-integer casting of the input data before being input to the computation unit (which is an integer unit). In case of a hybrid-float type, each computation unit of the set of computation units may comprise integer elements that process the mantissa part of the input operands and an x-bit exponent element that provides the exponent which may be shared between the input operands. This may enable to execute the operation fast in integer arithmetic so that at the end the results may also share the exponent of the input operands. Thus, a user is experiencing I/O data in floating point, but the hardware is operating in integer.

The input data of each operation of the set of operations may be represented by a number of bits Nb. The number of bits that represents the input data of the first executed operation of the set of operations may be N1. If Nb of each operation of the remaining operations of the set of operations is smaller than or equal to N1, the selected computation unit of the first operation may be used to execute the remaining operations of the set of operations, e.g., the method (excluding steps 805 and 807) may be repeated for each further operation of the set of operations using the selected computation unit. If Nb of any operation of the set of operation may be higher than N1, the method may be repeated such that a computation unit is selected for each operation execution.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A hardware accelerator for executing a computation task composed of a set of operations, the hardware accelerator comprising:
    a controller and a set of computation units, wherein each computation unit of the set of computation units being configured to receive input data of an operation of the set of operations and to perform the operation, wherein the input data is represented by a distinct bit length associated with each computation unit, and wherein the set of computation units is associated with a set of bit lengths; and
    the controller being configured to receive the input data represented with a certain bit length of the set of bit lengths and to select the computation unit of the set of computation units that can deliver a valid result and that is associated with a bit length smaller than or equal to the certain bit length, wherein an output of the selected computation unit is provided as a result of the operation.

2. The hardware accelerator of claim 1, the controller being configured to stop execution of the operation by non-selected computation unit(s).

3. The hardware accelerator of claim 1, the input data being received simultaneously at the set of computation units and the controller.

4. The hardware accelerator of claim 1, the selected computation unit being associated with a smallest bit length that is smaller than or equal to the certain bit length.

5. The hardware accelerator of claim 1, the certain bit length being a highest bit length of the set of bit lengths.

6. The hardware accelerator of claim 1, the set of computation units comprising a first computation unit associated with the certain bit length, wherein each computation unit of the set of computation units that is different from the first computation unit is a replication unit of the first computation unit.

7. The hardware accelerator of claim 1, the certain bit length of the set of bit lengths being n-bit, wherein each computation unit of the set of computation units that is associated with a bit length k-bit is configured to read the k least significant bits (LSB) of the received input data, wherein k-bit is smaller than n-bit.

8. The hardware accelerator of claim 1, being selected from the group consisting of a field-programmable gate array (FPGA), a graphics processing unit (GPU), and an application-specific integrated circuit (ASIC).

9. The hardware accelerator of claim 8, the set of computation units comprising a minimum number of computation units such that a logic utilization of the FPGA is higher than a predefined threshold.

10. The hardware accelerator of claim 1, a number of computation units of the set of computation units being the number of bits of the highest bit length of the set of bit lengths.

11. The hardware accelerator of claim 1, the computation task comprising one of: training a deep neural network, inference of a deep neural network, matrix-vector multiplication, and matrix-matrix multiplication.

12. The hardware accelerator of claim 1, the input data of the operation comprising two operands, the controller comprising logic gates to determine a maximum number of leading zeros that is present in the operands of the input data, wherein the maximum number of leading zeros is indicative of a bit length of the selected computation unit.

13. A method for executing a computation task composed of a set of operations, the method comprising:
    providing a hardware accelerator comprising a controller and a set of computation units;
    receiving, at each computation of the set of computation units, input data of an operation of the set of operations and starting the operation, wherein the input data is represented with a distinct bit length associated with each computation unit, and wherein the set of computation units is associated with a set of bit lengths;
    receiving, at the controller, the input data represented with a certain bit length of the set of bit lengths;
    selecting, by the controller, the computation unit of the set of computation units that can deliver a valid result, the selected computation unit being associated with a bit length smaller than or equal to the certain bit length; and
    providing the output of the selected computation unit as a result of the operation.

14. The method of claim 13, wherein providing the hardware accelerator comprises:
    providing the hardware accelerator comprising the controller and a first computation unit configured to receive the input data of the operation and to perform the operation, wherein the input data is represented with a bit length n-bit;
    creating one or more replication units of the first computation unit, wherein each created replication unit of the replication units is configured to receive the input data of the operation and to perform the operation, wherein the input data is represented with a bit length k-bit, where k is smaller than n, k<n; and the set of computation units comprising the first computation unit and the created replication units.

15. The method of claim 14, the hardware accelerator comprising a field-programmable gate array (FPGA), wherein creating each replication unit of the replication units comprises:
  generating a bitstream file, and
  programming the FPGA in accordance with the bitstream file so that a portion of the FPGA is configured as the replication unit.

16. The method of claim 15, being automatically performed.

17. The method of claim 13, further comprising repeating the receiving step, the selection step, and the providing step for each operation of the set of operations.

18. A computer program product for executing a computation task composed of a set of operations, the computer program product comprising:
  one or more computer readable storage media and program instructions stored on the one or more computer readable storage media, the program instructions comprising:
  program instructions to provide a hardware accelerator comprising a controller and a set of computation units;
  program instructions to receive, at each computation of the set of computation units, input data of an operation of the set of operations and starting the operation, wherein the input data is represented with a distinct bit length associated with each computation unit, and wherein the set of computation units is associated with a set of bit lengths;
  program instructions to receive, at the controller, the input data represented with a certain bit length of the set of bit lengths;
  program instructions to select, by the controller, the computation unit of the set of computation units that can deliver a valid result, the selected computation unit being associated with a bit length smaller than or equal to the certain bit length; and
  program instructions to provide the output of the selected computation unit as a result of the operation.

\* \* \* \* \*